(12) United States Patent
Sorenson (10) Patent No.: US 9,908,705 B2
(45) Date of Patent: Mar. 6, 2018

(54) APPARATUS FOR CONVEYING ITEMS AND DRIVE SYSTEM THEREFOR

(71) Applicant: FRUIT GROWERS SUPPLY COMPANY, Sherman Oaks, CA (US)

(72) Inventor: David Michael Sorenson, Visalia, CA (US)

(73) Assignee: FRUIT GROWERS SUPPLY COMPANY, Sherman Oaks, CA (US)

(*) Notice: Subject to any disclaimer, the term of this patent is extended or adjusted under 35 U.S.C. 154(b) by 0 days.

(21) Appl. No.: 15/016,107

(22) Filed: Feb. 4, 2016

(65) Prior Publication Data

US 2017/0225896 A1  Aug. 10, 2017

(51) Int. Cl.
*B65G 13/06* (2006.01)
*F16H 1/20* (2006.01)
*B65G 13/04* (2006.01)

(52) U.S. Cl.
CPC .............. *B65G 13/06* (2013.01); *B65G 13/04* (2013.01); *F16H 1/203* (2013.01); *B65G 2201/0211* (2013.01)

(58) Field of Classification Search
CPC .................. B65G 13/04; B65G 13/06; B65G 2201/0211; F16H 1/203
See application file for complete search history.

(56) References Cited

U.S. PATENT DOCUMENTS

| | | | |
|---|---|---|---|
| 778,613 A * | 12/1904 | Ward | B65G 13/04 198/608 |
| 895,622 A * | 8/1908 | Fawell | B65G 13/04 198/791 |
| 1,549,499 A | 8/1925 | Parker | |
| 1,776,419 A | 9/1930 | Dodge | |
| 2,748,919 A * | 6/1956 | Britton | B65G 13/04 198/791 |
| 3,568,821 A | 3/1971 | Gronkvist | |
| 3,610,404 A | 10/1971 | Fleischauer et al. | |
| 3,672,486 A * | 6/1972 | Kennedy | B21B 39/12 198/791 |
| 3,675,760 A | 7/1972 | Burrage et al. | |
| 3,944,037 A | 3/1976 | Stease | |
| 4,015,706 A * | 4/1977 | Goffredo | B65G 13/04 198/583 |
| 4,046,248 A * | 9/1977 | Goffredo | B21D 43/057 198/583 |
| 4,564,100 A * | 1/1986 | Moon | B65G 13/06 104/168 |
| 4,759,434 A | 7/1988 | Dorner | |
| 4,990,353 A * | 2/1991 | van der Schoot | A23N 12/023 134/25.3 |
| 5,762,177 A * | 6/1998 | Baker | B65G 13/04 193/35 R |
| 6,752,261 B1 | 6/2004 | Gaeddert et al. | |

(Continued)

*Primary Examiner* — Leslie A Nicholson, III
*Assistant Examiner* — Keith R Campbell
(74) *Attorney, Agent, or Firm* — Procopio, Cory, Hargreaves & Savitch LLP (57) ABSTRACT

A roller brush bed and drive system includes a motor, a motor drive shaft mechanically coupled to the motor, the motor drive shaft extending orthogonal to the roller brush, at least one gearbox mechanically coupled to the motor drive shaft, the at least one gearbox configured to mechanically couple to the roller brush and transmit torque from the motor drive shaft to the roller brush.

18 Claims, 8 Drawing Sheets

(56) References Cited

U.S. PATENT DOCUMENTS 7,882,945 B2 * 2/2011 Willi ..................... B65G 13/04
                                                    198/781.07
9,108,802 B2 * 8/2015 Wehner ................... B60P 1/38

* cited by examiner

APPARATUS FOR CONVEYING ITEMS AND DRIVE SYSTEM THEREFOR

BACKGROUND

Field

The present disclosure relates to conveying devices, and more specifically to conveying devices having a modular, alternate side drive system.

Related Art

Figure 1:
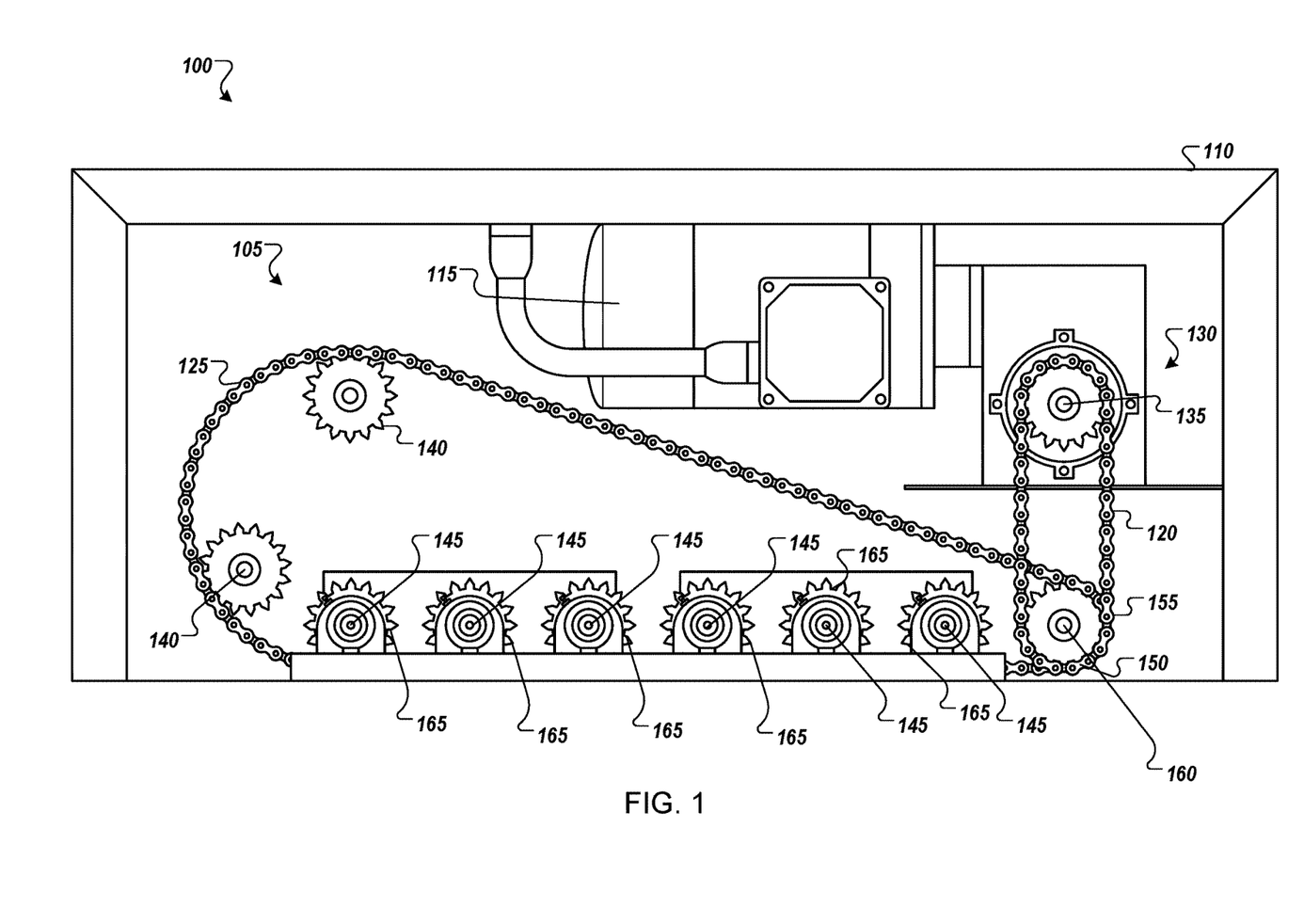
FIG. 1 illustrates a side view of a related art roller brush bed.

Related art conveying apparatuses, such as roller brush beds, are often used to transport produce through packing and sorting houses so that a variety of cleaning and sanitizing processes may be applied to the produce. An example related art drive system 105 for an example conveying apparatus 100 (e.g., roller brush bed) is illustrated in FIG. 1. As illustrated in FIG. 1, the related art drive system 105 is located with a housing 110 to protect the drive system from the elements, because the example conveying apparatus 100 is often placed in a moist environment open to the elements in many packing houses. Within the housing 110, the drive system 105 includes a motor 115 coupled to a series of roller brush shafts 145 by a transmission 130. The motor 115 is often an electric motor, but can also be a fuel powered motor (e.g., a gasoline motor). In some configurations of the related art, the motor 115 is located outside of the housing and the transmission 130 passes through the housing 110.

The transmission 130 includes a motor sprocket 135 that couples the motor 115 to motor drive chain 120. Torque from the motor 115 is transmitted to the motor drive chain 120 by the motor sprocket 135. The motor drive chain 120 is wrapped around a downstream sprocket 150.

The downstream sprocket 150 is mounted on shaft, and is configured to rotate with, a shaft 160 located below the motor. A second sprocket 155 (located behind the downstream sprocket 150 in FIG. 1) is also mounted on the shaft 160 and is coaxially aligned with the downstream sprocket 150. The second sprocket 155 is also configured to rotate with the shaft 160. Thus, the torque transmitted to the downstream sprocket 150 by the motor drive chain 120 is transmitted to the sprocket 155 by the shaft 160.

A roller brush drive chain 125 is wrapped around the second sprocket 155. The roller brush drive chain 125 is also wrapped around a pair of support sprockets 140 and roller brush drive sprockets 165. Torque received by the sprocket 155 is transmitted to the roller brush drive sprockets 165 by the roller brush drive chain 125. Each of the roller brush drive sprockets 165 is mounted on one of the roller brush shafts 145 and transmits the torque received from the roller brush drive chain 125 to the roller brush shaft 145.

Related art drive systems such as the drive system 105 illustrated in FIG. 1 may suffer from several problems including chain slippage, lubrication contamination, and excessive noise due to the number of rotating components. Further, the drive system 105 may also suffer from frequent break downs to chain breakage and sprocket slippage, resulting in frequent downtime and lost usability of the conveying apparatus. Additionally, the arrangement of the related art drive systems also make it difficult to perform maintenance without completely disassembling the drive because individual sprockets cannot be removed or replaced without removing the chain and other sprockets. Further, related art drive systems may also be difficult to customize to different work environments due to a requirement to manufacture chain lengths to the specific work environment.

SUMMARY

Aspects of the present application may include a drive system for at least one roller brush. The drive system includes a motor, a motor drive shaft mechanically coupled to the motor, the motor drive shaft extending orthogonal to the roller brush, at least one gearbox mechanically coupled to the motor drive shaft, the at least one gearbox configured to mechanically couple to the roller brush and transmit torque from the motor drive shaft to the roller brush.

Other aspects of the present application may include a roller brush bed for moving objects along a direction of travel. The roller brush bed includes a first housing and a second housing, both of the first housing and the second housing extending substantially orthogonal to the direction of travel, a roller brush extending between the pair of housings, the roller brush comprising a central shaft and an outer brush surface surrounding the central shaft, a drive system disposed within the first housing, the drive system including a motor, a motor drive shaft mechanically coupled to the motor, the motor drive shaft extending orthogonal to the roller brush, at least one gearbox mechanically coupled to the motor drive shaft, the at least one gearbox mechanically coupled to the central shaft of the roller brush and configured to transmit torque from the motor drive shaft to the roller brush.

DETAILED DESCRIPTION

The subject matter described herein is taught by way of example implementations. Various details have been omitted for the sake of clarity and to avoid obscuring the subject matter. The examples shown below are directed to structures for a roller brush bed and a drive system therefor.

Aspects of the example implementations are directed to a drive system that includes a motor mechanically coupled to a motor drive shaft, and one or more gear boxes mechanically coupled to the motor drive shaft and transmitting torque from the motor drive shaft to roller brush shafts extending orthogonal to the motor drive shaft.

Figure 2:
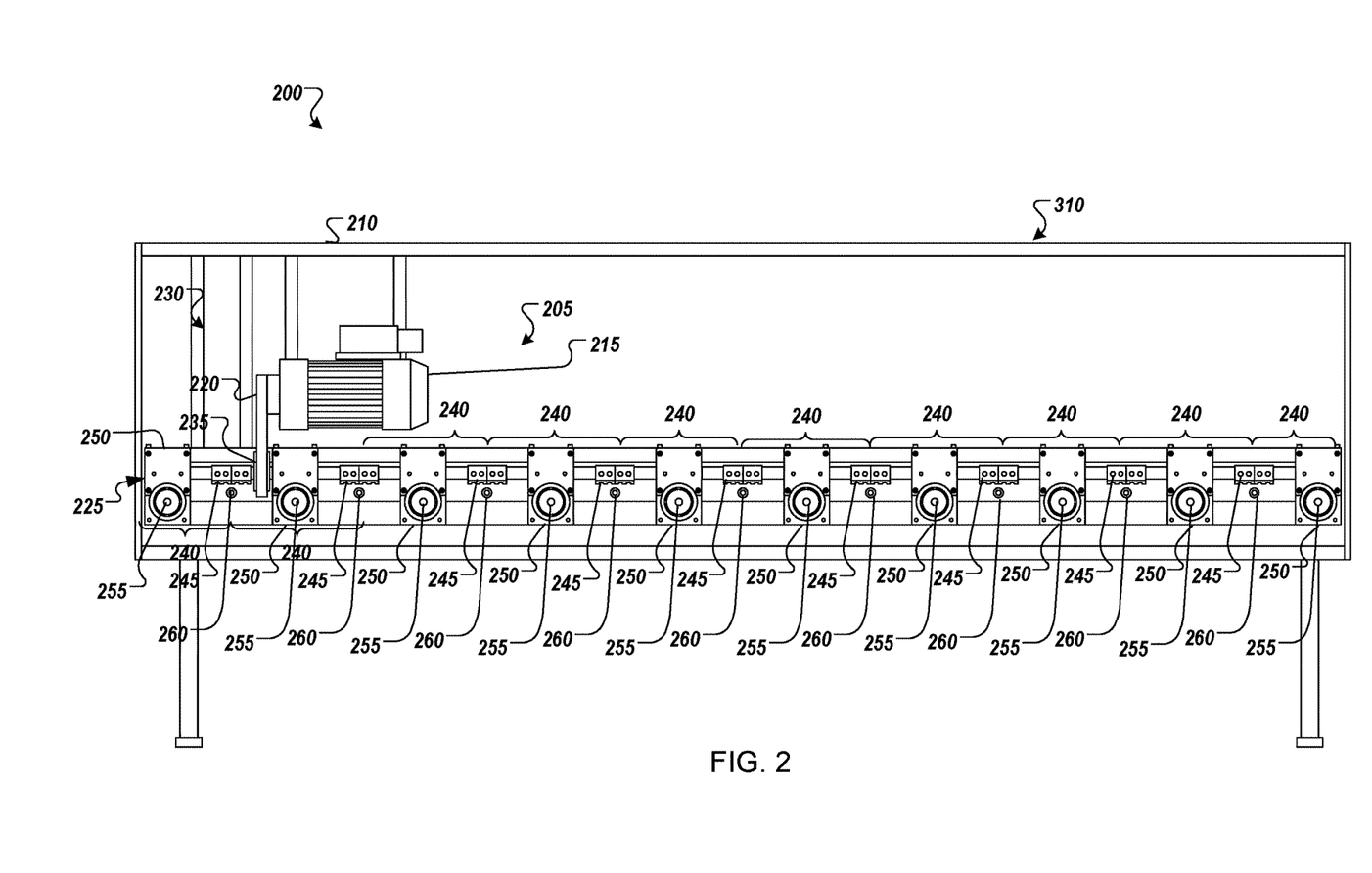
FIG. 2 illustrates a side view of a roller brush bed according to an example implementation of the present application.

FIG. 2 illustrates a side view of a roller brush bed 200 according to an example implementation of the present application. As illustrated, the roller brush bed 200 includes a first housing 210, which houses a drive system 205. The first housing 210 may form a rectangular structure that surrounds the drive system 205. The first housing 210 may include openings through which central shafts 255, 260 of a plurality of roller brushes (not labeled in FIG. 2; 405 and 420 in FIGS. 4 and 5 below) may pass. The material construction of the first housing 210 is not particularly limited and may include any material that may be obvious to a person of ordinary skill in the art. For example, the first housing 210 may be formed from aluminum, rolled steel, cast iron, or any other material that a person of ordinary skill in the art may select.

The roller brush bed 200 also includes a second housing 310 (illustrated behind the first housing 210 in FIG. 2). The second housing 310 may be similar to the first housing 210, and in some example implementations, the second housing 310 may house a second drive system 305 as discussed below with respect to FIG. 3. The second housing 310 may also form a rectangular structure that surrounds the second drive system 305 and may also include openings (unlabeled in the figures of the present application) through which the central shafts 255, 260 of the plurality of roller brushes (not labeled in FIG. 2) may pass. The material construction of the second housing 310 is also not limited and may be any material selected by a person of ordinary skill in the art including but not limited to aluminum, steel, iron, or any other material.

Figure 4:
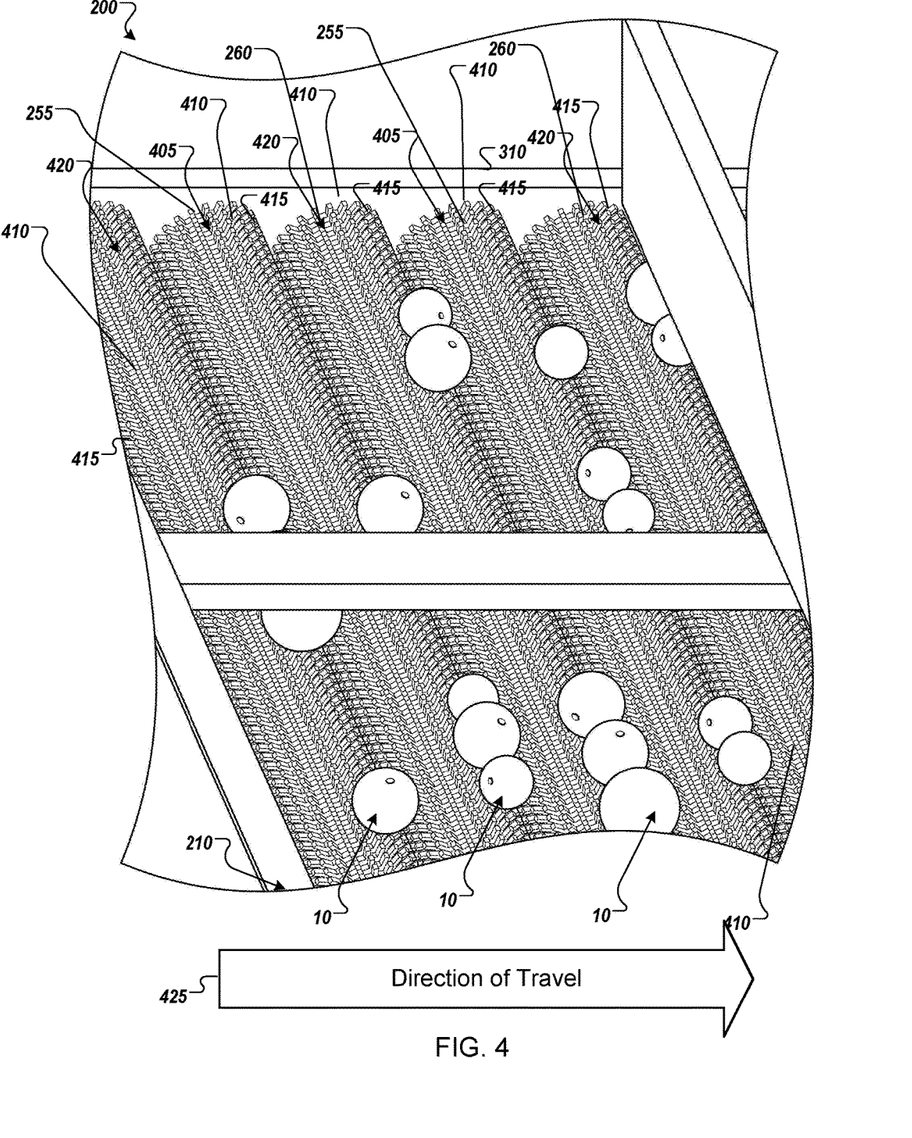
FIG. 4 illustrates a side perspective view of roller brushes of a roller brush bed according to an example implementation of the present application.
Figure 5:
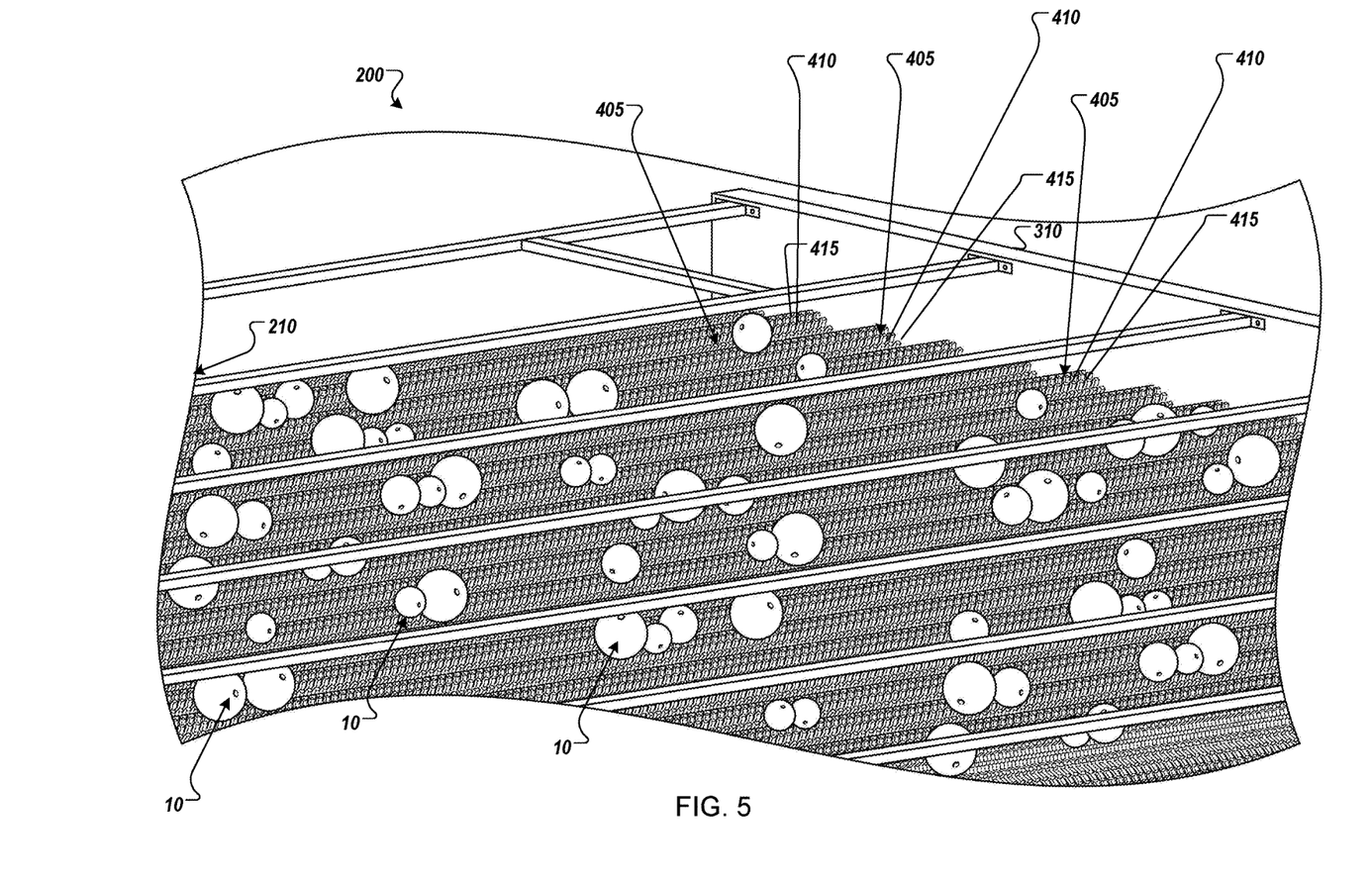
FIG. 5 illustrates a perspective view of roller brushes of a roller brush bed according to an example implementation of the present application.

In FIG. 2, the drive system 205 may include a motor 215 coupled to a transmission 230 which transmits torque from the motor 215 to one or more of the central shafts 255 of the plurality of roller brushes (not labeled in FIG. 2; 405 in FIGS. 4 and 5). As illustrated in FIG. 2, the transmission 230 may only transmit torque to the non-adjacent central shafts 255 of the plurality roller brushes (not labeled in FIG. 2; 405 in FIGS. 4 and 5) and may not transmit torque to the central shafts 260 located between the central shafts 255 to which torque is transmitted by the transmission 230. In other words, the transmission 230 may transmit torque to the central shafts 255 of every other roller brush (not labeled in FIG. 2; 405 in FIGS. 4 and 5), with the transmission 230 not transmitting torque to central shafts 260. However, example implementations of the present application are not limited to this configuration and, in some example implementations, the transmission 230 may transmit torque to all central shafts 255, 260 of every roller brush (not labeled in FIG. 2; 405, 420 in FIGS. 4 and 5), or may transmit torque to adjacent central shafts 255, 260.

The transmission 230 may include a belt 220 which mechanically couples the motor 215 to a drive wheel 235 mounted on a motor drive shaft 225. As illustrated, in some example implementations, the motor drive shaft 225 may be oriented to extend along the length of the housing 210 and orthogonal to the central shafts 255, 260 of the roller drive brushes. The belt 220 may transmit torque from the motor 215 to the drive wheel 235. Further, the drive wheel 235 may transmit torque to the motor drive shaft 225. In some example limitations, the motor drive shaft 225 may be formed by a plurality of shaft sections 240 which are joined together by linear shaft connectors 245, as discussed in greater detail below in perspective FIGS. 7 and 8.

The motor drive shaft 225 may be mechanically coupled to one or more of a plurality of gearboxes 250. In some example implementations, each of the plurality of gearboxes 250 may be a right angle gearbox configured to output torque to an output shaft orthogonal to an input shaft. For example, each of the plurality gearboxes 250 may be a hypoid gearbox. In such example implementations, the input shaft may be the motor drive shaft 225, and the output shaft may be one of the central shafts 255 of a roller drive brush. This configuration may allow each of the plurality gearboxes 250 to transmit torque received from the motor drive shaft 225 to drive one of the central shafts 255 of a roller brush (not labeled in FIG. 2; 405 in FIGS. 4 and 5).

Figure 3:
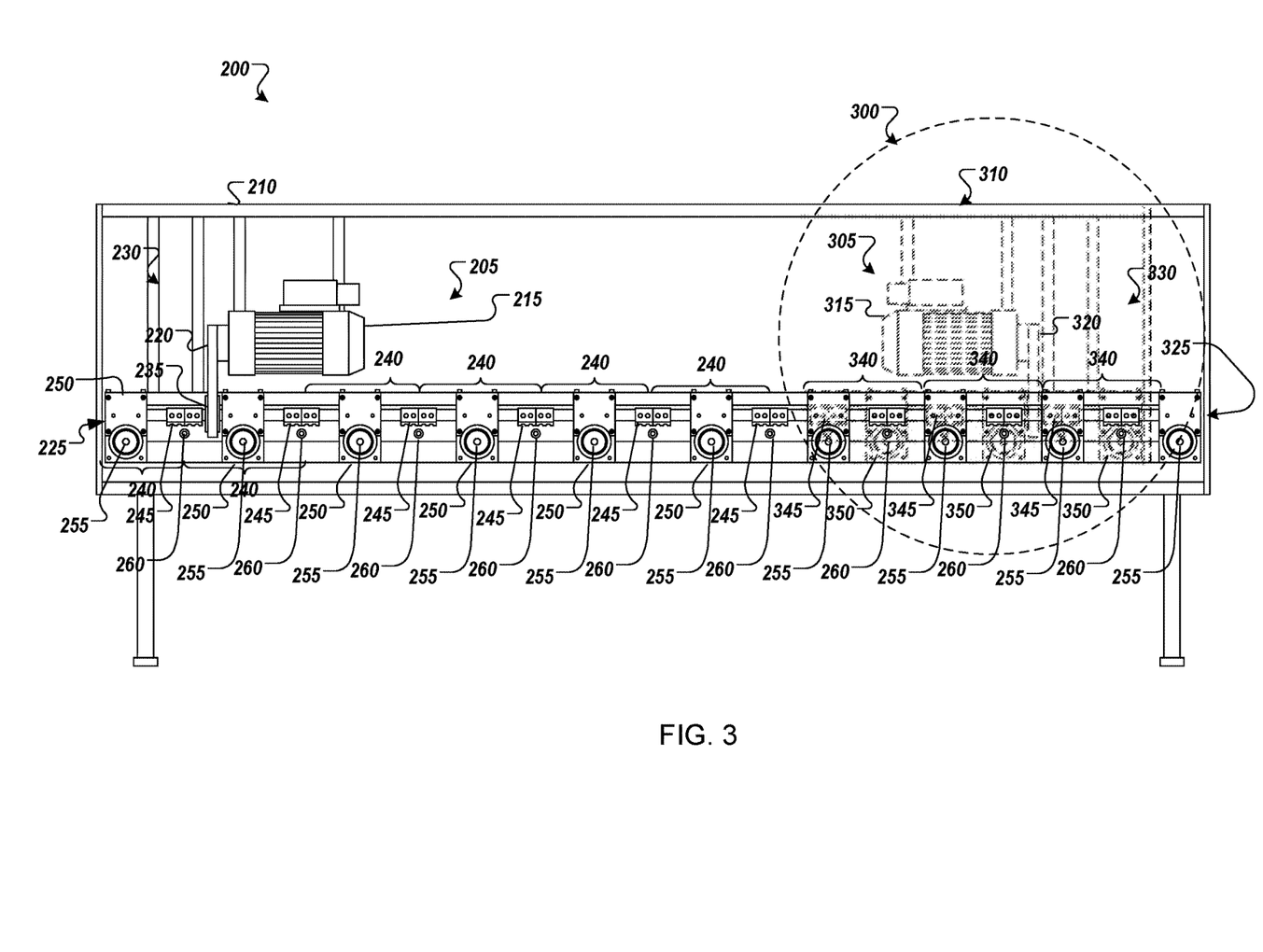
FIG. 3 illustrates a partial transparent side view of a roller brush bed according to an example implementation of the present application.

FIG. 3 illustrates a partial transparent side view of a roller brush bed 200 according to an example implementation of the present application. FIG. 3 is substantially similar to FIG. 2, but illustrates a portion of the interior 300 of the second housing 310 in broken lines. Within the interior 300 of the second housing 310, a second drive system 305 is illustrated. In some example implementations, the second drive system 305 may have an orientation that is a reverse of the orientation of the first drive system 205 as illustrated in FIG. 3. For example, if the motor 215 of the first drive system 205 is located at one end (e.g., left side in FIG. 3) of the first housing 210, the motor 315 of the second drive system 305 may be located at an end of the second housing 310 opposite (e.g., right side in FIG. 3). Such a configuration may allow tighter packing of components of the roller brush bed 200 within the first housing 210 and the second housing 310. However, example implementations of the present application are not limited to this configuration.

The second drive system 305 may include another motor 315 coupled to a transmission 330, which transmits torque from the motor 315 to the central shafts 260 that do not receive torque from the motor 215 of the first drive system 205. With this configuration, the first drive system 205 provides torque to every other central shaft 255 of roller brushes and the second drive system 305 may provide torque to the central shafts 260 of roller brushes that do not receive torque from the first drive system 205. Such a configuration may be referred to as "an alternating drive system".

The transmission 330 may include a belt 320 that transmits torque from the motor 315 to a drive wheel 335 mounted on a motor drive shaft 325. The motor drive shaft 325 may be oriented to extend along the length of the housing 310 and orthogonal to the central shafts 255, 260 of the roller drive brushes. The belt 320 may transmit torque from the motor 315 to the drive wheel 335. Further, the drive wheel 335 may transmit torque to the motor drive shaft 325. In some example limitations, the motor drive shaft 325 may be formed by a plurality of shaft sections 340 which are joined together by linear shaft connectors 345, as discussed in greater detail below perspective FIGS. 6 and 7.

The motor drive shaft 325 may be mechanically coupled to one or more of a plurality of gearboxes 350. In some example implementations, each of the plurality of gearboxes 350 may be a right angle gearbox configured to output torque to an output shaft orthogonal to an input shaft. For example, each of the plurality gearboxes 350 may be a hypoid gearbox. In such example implementations, the input shaft may be the motor drive shaft 325, and the output shaft may be one of the central shafts 260 of a roller drive brush. This configuration may allow each of the plurality gearboxes 350 to transmit torque received from the motor drive shaft 325 to drive one of the central shafts 260 of a roller brush (not labeled in FIG. 3; 405, 420 in FIGS. 4 and 5).

FIG. 4 illustrates a side perspective view of roller brushes 405, 420 of a roller brush bed 200 according to an example implementation of the present application viewed from a side of the housing 210. FIG. 5 illustrates a perspective view of the roller brushes 405, 420 of a roller brush bed 200 from a different viewing angle located downstream of the roller brush bed 200. As illustrated, each roller brush 405, 420 extends between the first housing 210 and the second housing 310 and is supported by a central shaft 255, 260. Specifically, the roller brushes 405 are supported by the central shafts 255, which may be driven by the drive system 205 illustrated in FIGS. 2 and 3. Further, the roller brushes 420 are supported by the central shafts 260 that may be driven by the drive system 305 illustrated in FIG. 3. In some example implementations, a single drive system may drive both the central shafts 255, 260 of both the roller brushes 405 and the roller brushes 420.

Though, roller brushes 405 may be driven by a different drive system from the roller brushes 420, all roller brushes 405, 420 may be structurally similar. Thus, similar reference numerals have been used to describe similar features. Each roller brush 405, 420 may include an outer roller brush surface 410 that surrounds each central shaft 255, 260. The outer roller brush surfaces 410 may include a plurality of bristles 415 extending outward from the outer brush surface 410. In some example implementations, the bristles 415 may be formed from nylon, foam rubber, or any other material that may be apparent to a person of ordinary skill in the art for use in handling produce or other goods being directed through the roller brush bed 200.

The outer roller brush surface 410 may be attached to each central shaft 255, 260 such that each outer roller brush surface 410 rotates with the rotation of the central shaft 255, 260 on which the outer roller brush surface 410 is mounted. The attachment between the outer roller brush surface 410 and the central shaft 255, 260 may be achieved by adhesive, screw mounting, bolt mounting, friction fitting, or any other attachment mechanism that may be apparent to a person of ordinary skill in the art.

As illustrated, the outer roller brush surfaces 410 of the roller brushes 405, 420 contact items of produce 10 (e.g., apples, oranges, grapefruit, etc.) that are being moved along the roller brush bed 200 in the direction of travel 425. In some example embodiments, the roller brushes 405, 420 may be level along the direction of travel 425. In other example embodiments, the roller brushes 405, 420 may be angled upward or downward along the direction of travel 425. The rotation of central shafts 255, 260, caused by torque from the drive systems 205, 305, may be translated to the outer roller brush surfaces 410 of the roller brushes 405, 420. The rotation of the outer roller brush surfaces 410 of the roller brushes 405, 420 may cause the produce 10 to move along the roller brush bed 200 in the direction of travel 425.

Figure 6:
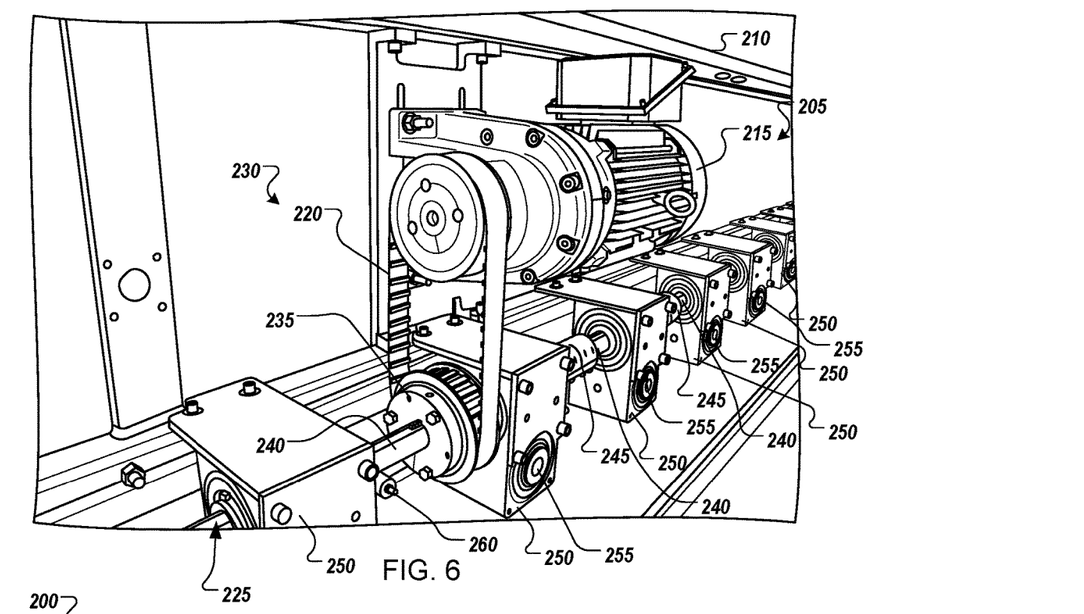
FIG. 6 illustrates an enlarged perspective view of the drive system of a roller brush bed according to an example implementation of the present application.

FIG. 6 illustrates an enlarged perspective view of the drive system 205 of a roller brush bed 200 according to an example implementation of the present application. Again, the drive system 205 includes a motor 215 that is mechanically coupled to a belt 220 that is wrapped around a drive wheel 235. The drive wheel 235 is mounted on the motor drive shaft 225. The motor drive shaft 225 may extend orthogonal to the central shafts 255, 260 of the roller brushes (not labeled in FIG. 6; 405, 420 in FIGS. 4 and 5). As illustrated, the motor drive shaft 225 passes through a plurality of gearboxes 250 that transmit torque from the motor drive shaft 225 to the central shafts 255 of the roller brushes (not labeled in FIG. 6; 405 in FIGS. 4 and 5). The plurality of gearboxes 250 may be right angle gearboxes (e.g., a hypoid gearbox) that transmit torque received from an input shaft (e.g., the motor drive shaft 225) at a right angle to an output shaft (e.g., the central shaft 255).

In the implementation illustrated in FIG. 6, torque from the motor drive shaft 225 is not transmitted to the central shafts 260 of the roller brushes. However, example implementations are not limited to this configuration and other example implementations may include gearboxes that transmit torque to all of the central shafts 255, 260 of the roller brushes (not labeled in FIG. 6; 405, 420 in FIGS. 4 and 5).

In FIG. 6, the motor drive shaft 225 is illustrated as being formed from a plurality of shaft sections 240 that are joined together by linear shaft connectors 245. However, example implementations are not limited to this configuration and may include a motor drive shaft 225 formed by a single shaft member extending the length of the first housing 210.

Figure 7:
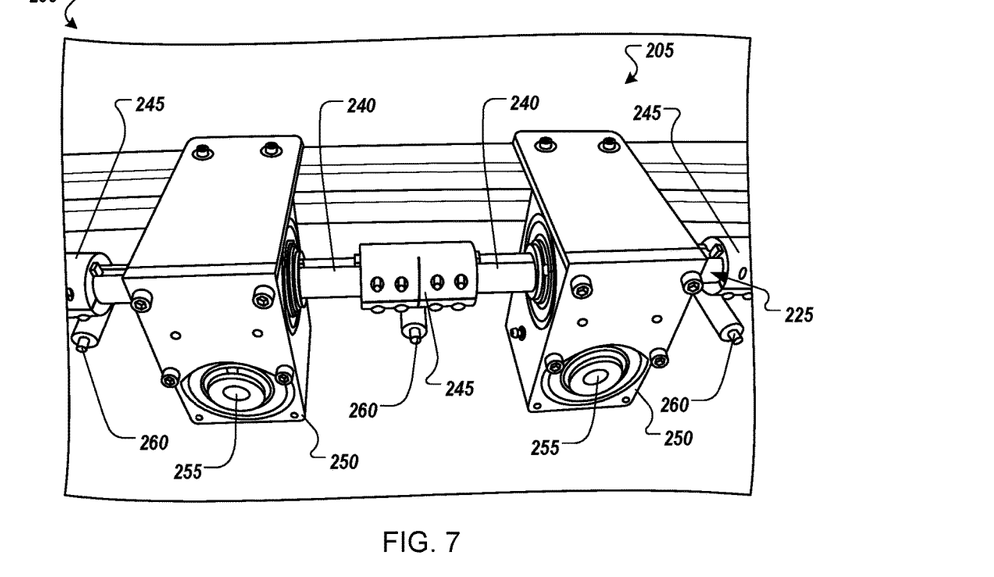
FIG. 7 illustrates an enlarged perspective view of a pair of gearboxes of the drive system of a roller brush bed according to an example implementation of the present application.

FIG. 7 illustrates an enlarged perspective view of a pair of gearboxes 250 of the drive system 205 of a roller brush bed 200 according to an example implementation of the present application. As illustrated, the gearboxes 250 are mounted on the ends of central shafts 255 of roller brushes (not labeled in FIG. 7; 405 in FIGS. 4 and 5) to transmit torque from the motor drive shaft 225 to the central shafts 255. In FIG. 7, no gearboxes are mounted on the ends of the central shafts 260 of the roller brushes (not labeled in FIG. 7; 420 in FIGS. 4 and 5). As discussed above with respect to FIG. 3, a separate (e.g., second) drive system (not illustrated in FIG. 7; 305 in FIG. 3) may be provided to drive the central shafts 260 that are not driven by the drive system 205). Such a configuration may allow for a more compact first housing 210 and second housing 310 on each side of the roller brush bed 200. However, example implementations are not limited to this configuration and other example implementations may include gearboxes that transmit torque to all of the central shafts 255, 260 of the roller brushes (not labeled in FIG. 7; 405, 420 in FIGS. 4 and 5).

In FIG. 7, the motor drive shaft 225 is illustrated as being formed from a plurality of shaft sections 240 that are joined together by linear shaft connectors 245. The linear shaft connectors 245 may attach to the shaft sections 240 by friction fit, press fit, threaded interface, adhesive, or any other attachment mechanism that may be apparent to a person of ordinary skill in the art. Each shaft section 240 passes through one of the gearboxes 250 and the linear shaft connectors 245 are disposed between each of the gearboxes 250. This configuration may allow individual gearboxes 250 to be removed, replaced, or repaired without having to remove all gearboxes or the whole motor drive shaft 225. However, example implementations are not limited to this configuration and may include a motor drive shaft 225 formed by a single shaft member extending the length of the first housing 210.

Figure 8:
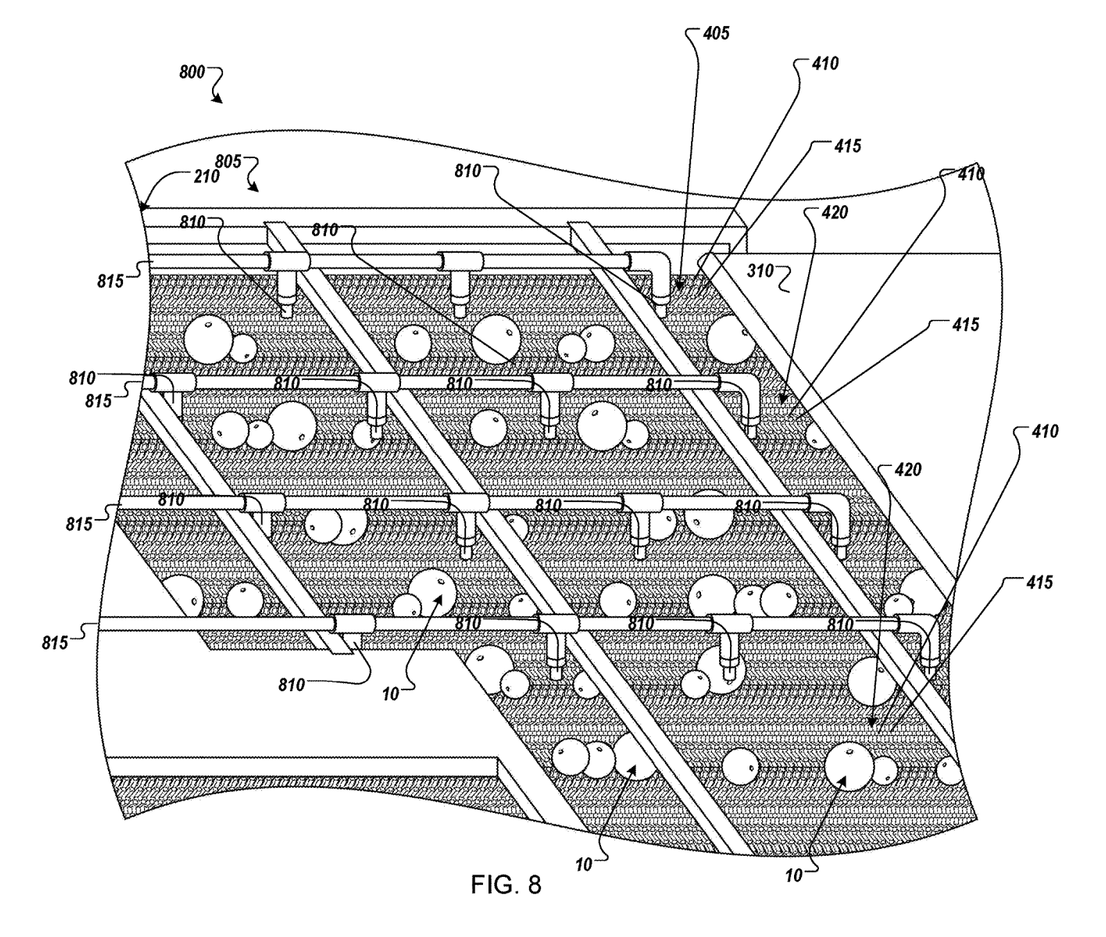
FIG. 8 illustrates a perspective view a roller brush bed according to another example implementation of the present application.

FIG. 8 illustrates a perspective view a roller brush bed 800 according to another example implementation of the present application. The roller brush bed 800 is substantially similar to the roller brush bed 200 illustrated in FIGS. 2-7 discussed above and may include any of the features of any of the above discussed implementations. In addition to the features of the above discussed implementations, the example implementation illustrated in FIG. 8 may include a fluid delivery system 805 located above the roller brushes 405, 420. The fluid delivery system 805 may include fluid delivery lines 815 that extend over the first housing 210 and connect to a plurality of sprayer nozzles 810. In other example implementations, the fluid delivery lines 815 may extend over the second housing 310, or may be oriented in another configuration that may be apparent to a person of ordinary skill in the art.

As illustrated, the sprayer nozzles 810 may be oriented to spray fluid toward the outer brush surfaces 410 of the roller brushes 405, 420. In some implementations, the sprayer nozzles 810 may be oriented to spray orthogonally to the roller brushes 405, 420 (e.g., to spray directly down on roller bushes 405, 420). In other example implementations, the sprayer nozzles 810 may be oriented to spray at an angle to the roller brushes 405, 420 (e.g., to spray at an acute angle to the roller brushes 405, 420). The sprayer nozzles 810 may be used to spray water, fungicides, or sterilizing agents onto the produce 10 as the produce 10 moves down the roller brush bed 200.

Figure 9:
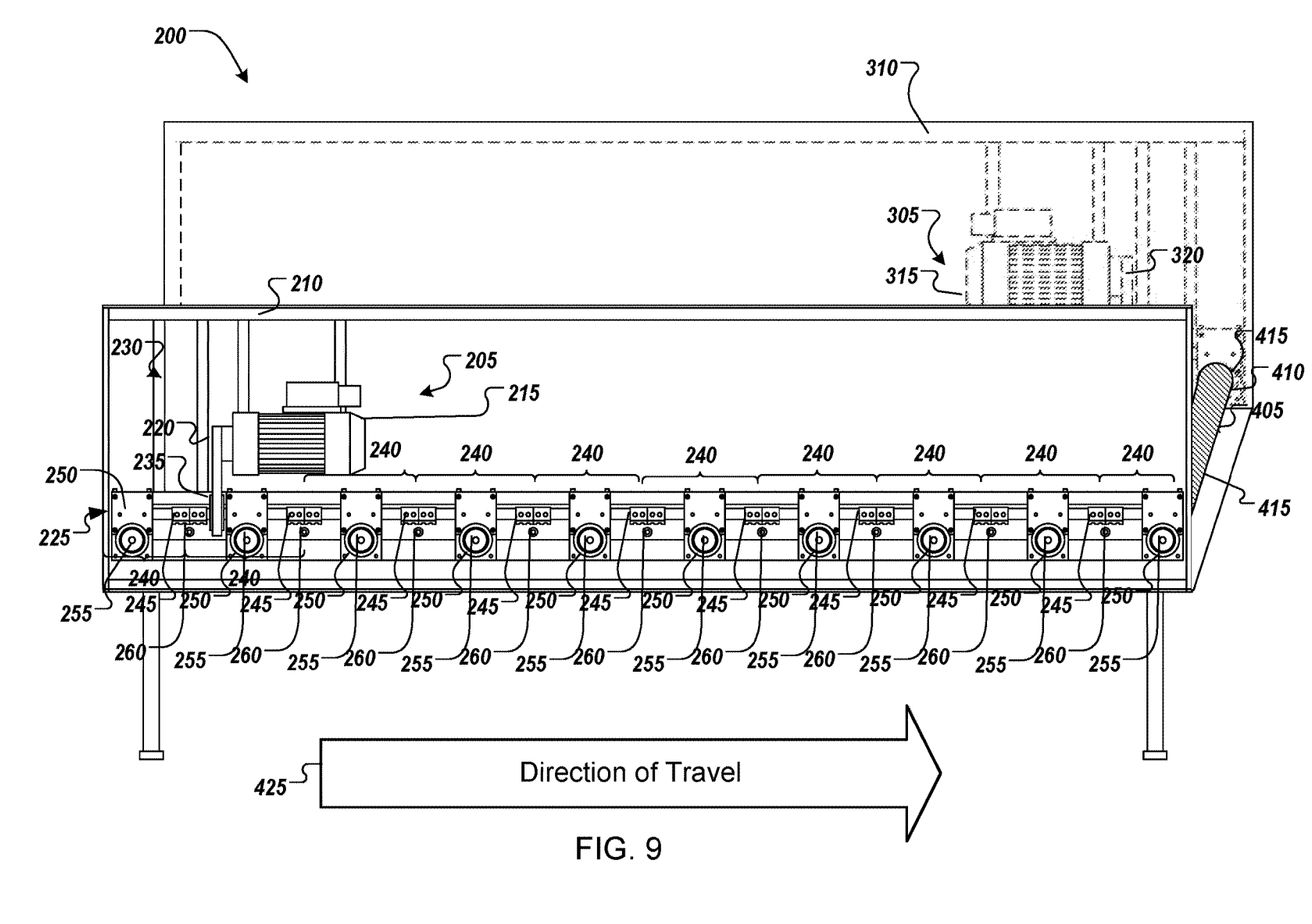
FIG. 9 illustrates a perspective view of the complete roller brush bed according to an example implementation of the present application.

FIG. 9 illustrates a perspective view of the complete roller brush bed 200 according to an example implementation of the present application. As illustrated, the rollers 405, 420 around mounted on the central shafts 255, 260 extending between the first housing 210 and the first housing 310. The first housing 210 includes the first drive system 205 discussed above in detail with respect to FIG. 2 that drive the rollers 405 to move goods or produce in the direction of travel 425. The second housing 310 includes the second drive system 305 discussed above in detail with respect to FIG. 3 that drive the rollers 420 to move goods or produce in the direction of travel 425.

The configuration of the first drive system 205 and the second drive system 305 may allow for a longer work life between maintenance periods because the drive motor shafts 225, 325 may have greater durability compared to a motor drive chain. Further, the individual gear boxes 255, 355 and the shaft sections 240, 340 may allow easier maintenance as individual gear boxes 255, 355 could be removed and replaced without having to remove the entire drive motor shaft 225, 325 or replace all gear boxes 25, 355. Some example implementations may feature quieter and/or smoother operation due to a reduction in vibration that may be achieved by the combination of the motor drive shafts 225, 325 and the individual gear boxes 255, 355.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

I claim:

1. A drive system for driving a roller brush bed comprising a first roller brush, a second roller brush adjacent to the first roller brush, and a third roller brush adjacent to the second roller brush, the second roller brush being disposed between the first roller brush and the third roller brush, the drive system comprising:
   a motor;
   a motor drive shaft mechanically coupled to the motor, the motor drive shaft extending orthogonal to at least one of the first roller brush, the second roller brush, and the third roller brush;
   a first gearbox and a second gearbox, each mechanically coupled to the motor drive shaft, the first gearbox configured to mechanically couple to the first roller brush and transmit torque from the motor drive shaft to the first roller brush, and the second gearbox configured to mechanically couple to the third roller brush and transmit torque from the motor drive shaft to the third roller brush,
   wherein the second roller brush, which is disposed between the first roller brush and the third roller brush, is not coupled to the drive system, and
   wherein the first roller brush and the third roller brush are driven at a rotational speed independent of a rotation speed of the second roller brush.

2. The drive system of claim 1, wherein at least one of the first gearbox and the second gearbox is a right angle gearbox.

3. The drive system of claim 2, wherein at least one of the first gearbox and the second gearbox is a hypoid gearbox.

4. The drive system of claim 1, wherein the roller brush bed further comprises a first plurality of additional roller brushes and a second plurality of additional roller brushes, wherein each of the first plurality of additional roller brushes and each of the second plurality of additional roller brushes are alternatingly arranged in sequence, such that each additional roller brush of the second plurality of additional roller brushes is disposed between a pair of additional roller brushes selected from the first plurality of additional roller brushes;
   wherein the drive system further comprises a plurality of additional gearboxes, each additional gearbox configured to mechanically couple to an additional roller brush selected from the first plurality of additional roller brushes, and
   wherein each of the second plurality of additional roller brushes is not coupled to the drive system.

5. The drive system of claim 4, wherein the motor drive shaft is mechanically coupled to each of the plurality of additional gearboxes.

6. The drive system of claim 5, wherein the motor drive shaft comprises a plurality of shaft sections and
   a plurality of linear shaft connectors,
   wherein each of the plurality of shaft sections is configured to mechanically couple to one of the plurality of additional gearboxes; and
   wherein each linear shaft connector selected from the plurality of linear shaft connectors is configured to removably couple a pair of shaft sections.

7. The drive system of claim 1, wherein the motor drive shaft mechanically couples to each of the first gearbox and the second gearbox.

8. The drive system of claim 7, wherein the motor shaft comprises a pair of shaft sections and
   at least one linear shaft connector,
   wherein each of the pair of shaft sections is configured to mechanically couple to one of the first and second gearboxes; and
   wherein the at least one linear shaft connector is configured to mechanically couple the pair of linear shaft sections.

9. A roller brush bed for moving an object along a direction of travel, the roller brush bed comprising:
   a first housing and a second housing, both of the first housing and the second housing extending substantially orthogonal to the direction of travel;
   a first roller brush extending between the first housing and the second housing;
   a second roller brush disposed adjacent to the first roller brush and extending between the first housing and the second housing;
   a third roller brush disposed adjacent the second roller brush with the second roller brush being between the first roller brush and the third roller brush, the third roller brush extending between the first housing and the second housing, wherein each of the first roller brush, the second roller brush and the third roller brush comprising a central shaft and an outer brush surface surrounding the central shaft;

a drive system disposed within the first housing, the drive system comprising:
  a motor;
  a motor drive shaft mechanically coupled to the motor, the motor drive shaft extending orthogonal to at least one of the first roller brush, the second roller brush, and the third roller brush;
  a first gearbox and a second gearbox, each mechanically coupled to the motor drive shaft, the first gearbox mechanically coupled to the central shaft of the first roller brush and transmitting torque from the motor drive shaft to the first roller brush and the second gearbox mechanically coupled to the central shaft of the third roller brush and transmitting torque from the motor drive shaft to the third roller brush,
  wherein the second roller brush, which is disposed between the first roller brush and the third roller brush, is not coupled to the drive system, and
  wherein the first roller brush and the third roller brush are driven at a rotational speed independent of a rotation speed of the second roller brush.

10. The roller brush bed of claim 9, wherein at least one of the first gearbox and the second gearbox is a right angle gearbox.

11. The roller brush bed of claim 10, wherein at least one of the first gearbox and the second gearbox is a hypoid gearbox.

12. The roller brush bed of claim 9, further comprising a first plurality of additional roller brushes and a second plurality of additional roller brushes, wherein each of the first plurality of additional roller brushes and each of the second plurality of additional roller brushes are alternatingly arranged in sequence, such that each additional roller brush of the second plurality of additional roller brushes is disposed between a pair of additional roller brushes selected from the first plurality of additional roller brushes;
  wherein the drive system further comprises a plurality of additional gearboxes, each additional gearbox mechanically coupled to a central shaft of an additional roller brush selected from the first plurality of additional roller brushes.

13. The roller brush bed of claim 12, wherein the motor drive shaft mechanically couples to each of the plurality of additional gearboxes.

14. The roller brush bed of claim 13, wherein the motor drive shaft comprises a plurality of shaft sections and
  a plurality of linear shaft connectors,
  wherein each of the plurality of shaft sections is mechanically coupled to one of the plurality of additional gearboxes; and
  wherein each linear shaft connector selected from the plurality of linear shaft connectors is mechanically coupled to a pair of shaft sections.

15. The roller brush bed of claim 9, wherein the motor drive shaft mechanically couples to each of the first gearbox and the second gearbox.

16. The roller brush bed of claim 15, wherein the motor drive shaft comprises a pair of shaft sections and
  at least one shaft connectors,
  wherein each of the pair of shaft sections is mechanically coupled to one of the first and second gearboxes; and
  wherein the linear shaft connector is mechanically coupled to the pair of shaft sections.

17. The roller brush bed of claim 9, further comprising a second drive system located within the second housing, the second drive system comprising:
  a second motor;
  a second motor drive shaft mechanically coupled to the second motor;
  a third gearbox mechanically coupled to the second motor drive shaft, the third gearbox mechanically couples to the central shaft of the second roller brush and transmits torque from the second motor drive shaft to the second roller brush.

18. The roller brush bed of claim 9, further comprising a sprayer nozzle located between the first housing and the second housing, the sprayer nozzle oriented to spray toward the outer brush surface of at least one of the first roller brush, the second roller brush, and the third roller brush.

* * * * *